United States Patent [19]

Bogese et al.

[11] 3,999,340

[45] Dec. 28, 1976

[54] INSULATING COVER AND CLAMP FOR GUY WIRES OR COVERS

[75] Inventors: Stephen B. Bogese; Charles E. Bogese; Stephen B. Bogese, II, all of Roanoke, Va.

[73] Assignee: Virginia Plastics Company, Roanoke, Va.

[22] Filed: Oct. 24, 1975

[21] Appl. No.: 625,385

[52] U.S. Cl. .............................. 52/147; 24/115 B; 24/132 LS; 24/135 K; 24/243 D; 24/248 SA; 138/156; 174/136

[51] Int. Cl.$^2$ .................. E04H 12/20; F16G 11/00; H01B 17/58

[58] Field of Search ............ 174/5 R, 41, 84 S, 90, 174/94 S, 136, 155, 156, 5, 84, 90, 94, 136; 24/115 B, 132 R, 132 LS, 135 R, 135 K, 135 N, 243 AC, 243 B, 243 D, 248 SA, 249 LS, 115, 132, 135, 243, 248, 249; 52/147; 138/158, 156, 167, 169; 339/263 R, 263 L, 264 R, 264 L, 263, 264

[56] References Cited

UNITED STATES PATENTS

| | | | |
|---|---|---|---|
| 2,061,306 | 11/1936 | Hocher et al. | 52/147 |
| 3,173,519 | 3/1965 | Sullivan | 52/147 |
| 3,177,542 | 4/1965 | James | 24/243 B X |
| 3,428,742 | 2/1969 | Smith | 174/136 |
| 3,486,534 | 12/1969 | Terkel et al. | 138/169 X |
| 3,868,193 | 2/1975 | Schott | 24/135 R X |
| 3,897,664 | 8/1975 | Bogese | 52/147 |

FOREIGN PATENTS OR APPLICATIONS

| | | | |
|---|---|---|---|
| 901,186 | 1/1954 | Germany | 174/156 |
| 425,932 | 6/1967 | Switzerland | 174/41 |

*Primary Examiner*—Laramie E. Askin
*Attorney, Agent, or Firm*—Berman, Aisenberg & Platt

[57] ABSTRACT

An insulating protective cover sleeve assembly for a guy wire consisting of a longitudinally slit sleeve of insulating material having an enlarged bottom end portion. In the lower end portion of the sleeve is secured a clamp, likewise of insulating material. The clamp consists of two opposing jaws integrally connected by a flexible band. The jaws are formed with two sets of different-sized opposing arcuate recesses to receive different sizes of guy wires therebetween. One of the jaws has a counterbore hole to receive a clamping screw which is threadedly engageable in the other jaw to tighten the clamp. The wall of the enlarged sleeve portion has a hole registering with the counterbored hole so that a screwdriver or Allen wrench may be drivingly engaged with the clamping screw. A channel-shaped clip engages over the top corner portions of the sleeve segments adjacent the top of the sleeve slit and is secured to one segment. The assembly allows the sleeve to expand or contract without causing distortion thereof. In a modified arrangement, clamps are provided in both the top and bottom of the sleeve, but the top clamp is loose, allowing unrestricted expansion and contraction of the sleeve. The enlarged bottom end portion may be omitted and the clamp may be secured in the normal cross-section at the bottom end of the slit sleeve.

22 Claims, 8 Drawing Figures

FIG. 1.
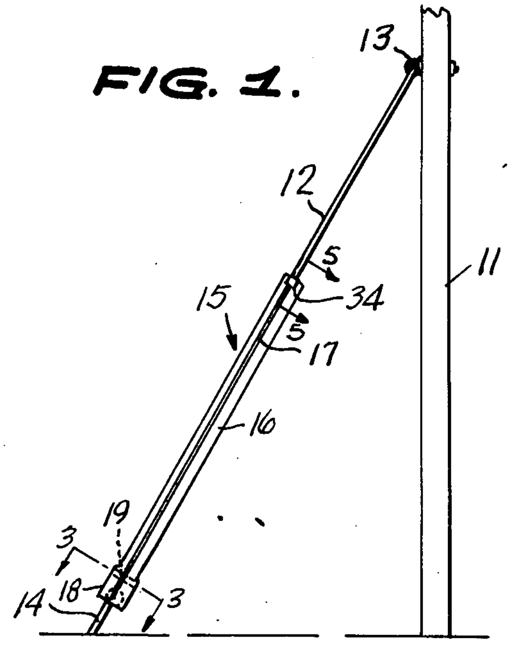
FIG. 2.
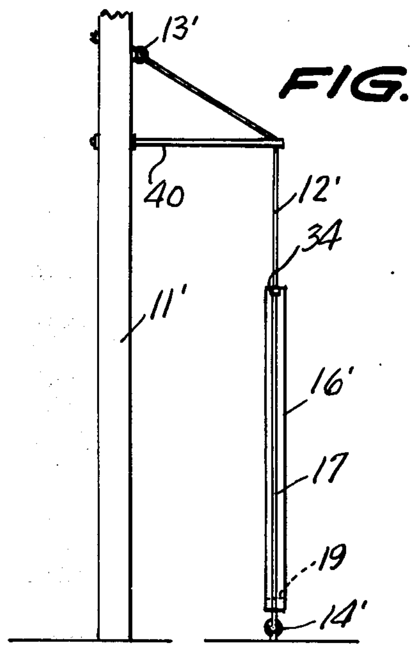
FIG. 3.
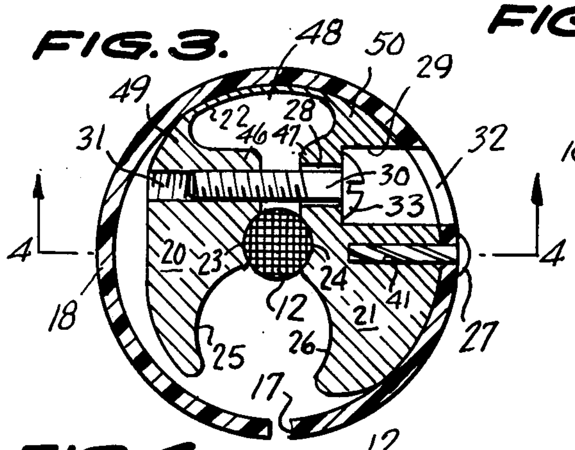
FIG. 5.
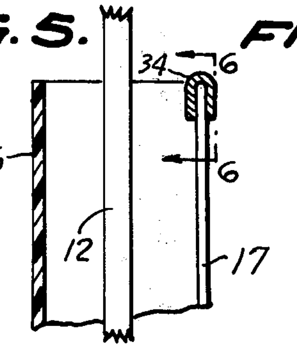
FIG. 6.
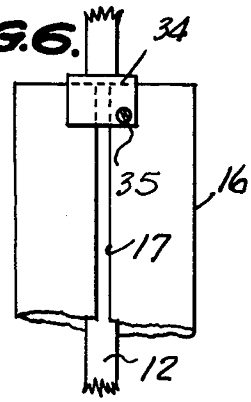
FIG. 4.
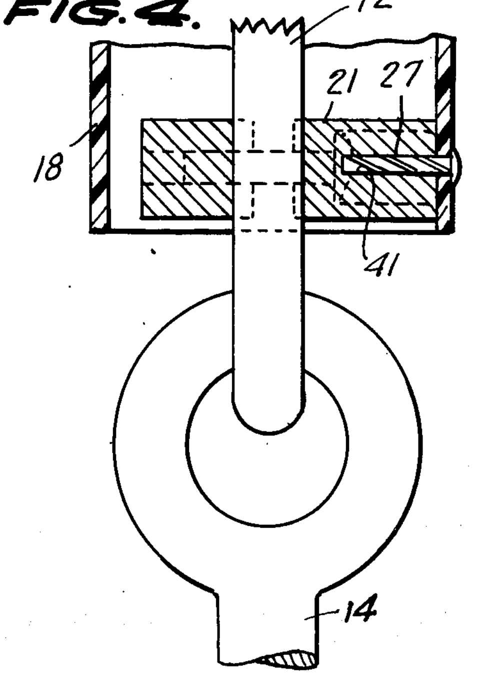
FIG. 7.
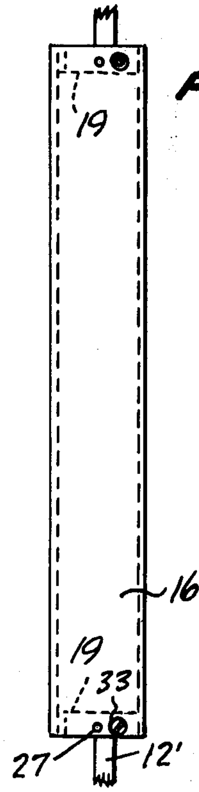
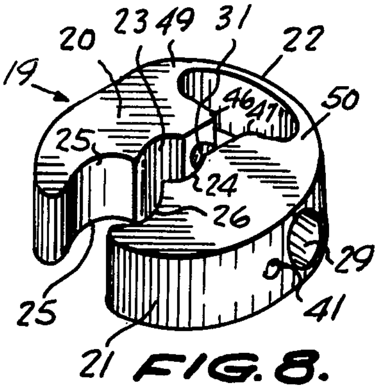
FIG. 8.

INSULATING COVER AND CLAMP FOR GUY WIRES OR COVERS

This invention relates to protective covers for guy wires or cables, and more particularly to an insulating protective sleeve assembly for a guy wire, anchoring rope or cable, or for similar supporting elements employed to support or anchor towers, tanks, feed bins, telephone and electric utility poles, and the like.

A main object of the invention is to provide a novel and improved insulated protective sleeve assembly for a guy wire, anchor cable, or the like, which is simple in construction, which is easy to install, and which provides an effective protective covering to protect people or animals from being injured by electrical shock or mechanical abrasion when they come in contact therewith.

A further object of the invention is to provide an improved insulated protective cover sleeve assembly for a guy wire, anchor cable, or similar supporting element, the sleeve assembly employing inexpensive parts, being rugged in construction, and freely allowing expansion and contraction of its major cover element without causing damage or distortion thereof.

A still further object of the invention is to provide an improved insulating protective sleeve assembly for a guy wire, anchor cable, or the like, the protective sleeve assembly being usable with a wide range of sizes of guy wires, anchor cables, or the like, without requiring modification of the assembly, the protective sleeve assembly being capable of being quickly installed, with a minimum amount of labor, and requiring the use of only a simple tool, such as a screwdriver, Allen wrench, or similar hand tool, for clampingly securing the sleeve assembly to the wire or cable.

Further objects and advantages of the invention will become apparent from the following description and claims, and from the accompanying drawings, wherein:

FIG. 1 is an elevational view showing an improved protective insulating sleeve assembly according to the present invention installed on an inclined guy wire used to support a telephone or utility pole.

FIG. 2 is an elevational view showing a protective insulating sleeve assembly according to the present invention, but without the enlarged bottom end portion shown in FIG. 1, installed on a vertical guy wire used for supporting a pole.

FIG. 3 is an enlarged cross-sectional view taken substantially on the line 3—3 of FIG. 1.

FIG. 4 is a cross-sectional view taken substantially on the line 4—4 of FIG. 3.

FIG. 5 is an enlarged vertical cross-sectional view taken substantially on line 5—5 of FIG. 1.

FIG. 6 is an elevational view taken substantially on line 6—6 of FIG. 5.

FIG. 7 is an elevational view of a modified form of protective insulating cover sleeve assembly according to the present invention employing clamps in both the top and bottom ends of the main sleeve.

FIG. 8 is a perspective view of a wire or cable clamp employed in a protective cover sleeve assembly of the present invention.

Referring to the drawings, FIG. 1 shows a telephone or electric utility pole 11 supported in a conventional manner by an inclined guy wire 12 connected between an eye bolt 13 on the pole and an anchor eye bolt 14 rigidly embedded in the ground. Designated at 15 is a protective insulating cover assembly according to the present invention, surrounding the lower portion of guy wire 12.

The cover assembly 15 comprises an elongated sleeve 16 of suitable tough resistant, somewhat flexible, material such as polyvinyl chloride plastic material, polyethylene, or other insulating material having similar properties. The elongated sleeve 16 has a longitudinal slit 17, enabling it to be easily engaged on the guy wire 12. Sleeve 16 may be provided with an enlarged bottom end portion 18 to provide required clearance for and coverage of the connection of the guy wire 12 to the anchor eye bolt 14, and particularly coverage of the eye portion of said anchor bolt.

Suitably secured in the top end of the enlarged portion 18 is a clamp member 19. Clamp member 19 may comprise a machined or injection molded body of appropriate material, such as the aforesaid tough, resistant plastic material, consisting of two relatively rigid opposing jaws 20, 21 integrally and yieldably connected by an arcuate resilient band 22 and defining jaw means aligned with slit 17 to receive a wire or cable 12 forced through the slit. The jaws are formed at their inner opposing surfaces with a first pair of arcuate jaw recesses 23, 24, defining means to receive a relatively small-diameter guy wire 12 therebetween, and with a second pair of larger arcuate jaw recesses 25, 26, spaced outwardly from and in line with the smaller jaw recesses 23, 24, defining means to receive a relatively large-diameter wire or cable therebetween.

The clamp body may be secured in the sleeve portion 18 by means of suitable cement, or may be secured mechanically in the manner shown in FIG. 3 by employing one or more rivets or bolts 27 extending through the wall of sleeve portion 18 and lockingly engaged in bore 41 provided in the clamp jaw 21, as shown in FIGS. 3 and 4.

Adjacent the recess 24 the jaw 21 is formed with a counterbore hole 28 having the counterbore recess 29. A clamping screw 30 extends through the hole 28 and is threadedly engaged in a tapped bore 31 provided in jaw 20 in alignment with hole 28. The wall sleeve portion 18 is formed with a hole 32 registering with the counterbore recess 29, providing access to the head 33 of screw 30 for a screwdriver. If an Allen screw is employed, hole 32 will similarly provide access for an Allen wrench.

The tapped bore 31 may be tapered to prevent the screw 30 from loosening due to vibration or wind conditions.

The movable jaw 20 is shaped to provide clearance for adjustment thereof in sleeve portion 18 for different sizes of wires or cable to be clamped either between the pair of jaw recesses 23,24 or between the pair of jaw recesses 25,26. This allows a wide range of wire or cable sizes to be clampingly engaged between the jaws.

A channel-shaped metal or plastic clip 34 is slidably engaged over the top corner portions of the segments of sleeve 16 adjacent slit 17, as shown in FIGS. 5 and 6. The clip 34 is secured to one of said corner portions by means of a bolt or rivet 35, as shown in FIG. 6.

Clamping bolt 30 may be of plastic or suitably coated metal, or of steel, brass, or the like, depending on the required usage. Bolt 30 is preferably long enough to remain threadedly engaged in tapped bore 31 while the clamp is loosened to receive the wire or cable 12 during installation of the protective sleeve assembly. Hole 28 is likewise sufficiently large to allow the required movement of jaw 20 during said installation.

The provision of the enlarged bottom sleeve portion 18, as above explained, provides accommodation for the holding eye of the anchor rod 14 over a wide range of conditions of location or orientation of the anchor rods relative to the ground level.

Due to expansion and contraction of the elongated sleeve 16 caused by temperature changes, said sleeve must be free to change its length. Thus, the top end of the assembly is free to move relative to the wire or cable 12. This prevents twisting or other distortion of the protective sleeve under a wide range of weather conditions. The use of the clip 34 as above described serves to hold the segments of sleeve 16 together adjacent slit 17 and to prevent removal by vandals. The use of only a bottom clamp, as compared with the heretofore used bottom, middle and top clamps with a long cover sleeve makes for a much easier installation. With the use of a top clamp, a lineman would have to stand on a suitable raised support to fasten the top clamp, thereby creating an installation safety hazard. This is avoided with the assembly shown in FIG. 1.

FIG. 2 shows an arrangement wherein the guy wire or cable, shown at 12', is secured to a pole 11' at 13', passes through an eye strut 40, and is vertically held below strut bar 40 by being connected to a ground anchoring eye bolt 14'. In this case, or in any other installation where it is not necessary to cover the ground anchor connection, the enlarged bottom portion may be omitted from the insulating cover sleeve, shown in FIG. 2 at 16', and the clamp 19 may be merely located in the bottom end of the sleeve.

FIG. 7 illustrates a modification employing a slit cover sleeve 16', with clamps 19 provided both in the top and bottom ends of the sleeve. In this case, the bottom clamp 19 is tightened to clampingly secure the assembly to the cable or guy wire 12', whereas the top clamp 19 is left loose to allow free expansion and contraction of the cover sleeve 16', while being slidably engaged with wire 12'.

In the embodiment of FIG. 1, the enlarged bottom sleeve portion 18 may be of any suitable shape, such as elliptical, semicircular (in elevation), or the like, to suitably enclose the anchor rod end eye and the relatively bulky dead-end loop at the bottom of the guy wire.

It will be noted that the clamp has a special configuration to provide maximum rigidity for the jaw elements 20, 21 and to also provide a strong but resilient connection between the jaw elements. Thus, as shown in FIG. 8, the band 22 is of generally arcuate shape, and the widest portions of the jaw elements respectively contain the tapped bore 31 and the screw-receiving bore 28. Said widest portions define corner elements 46, 47 which in turn define a substantially elliptical space 48 between the jaw elements 20, 21 and the band 22, the junctions of the ends of the band with the jaw elements flaring in thickness toward the jaw elements at 49, 50, as shown in FIGS. 3 and 8, to provide the aforesaid strong but resilient mutual connections of the jaw elements.

It will be further noted that the channel-shaped clip 34 not only inhibits removal by vandals, as above mentioned, but acts to hold the corner portions of the sleeve segments adjacent slit 17 in circumferential alignment during expansion and contraction of the sleeve member and thus prevents warping thereof.

In addition, it should be noted that more than two progressively larger opposing pairs of wire-gripping recesses may be provided in the opposing jaws 20, 21 and that any number of pairs of opposing wire-gripping recesses may be provided for covering a desired range of wire or cable sizes.

The elongated sleeve 16 or 16' may have a colored coating bonded to and over the base plastic material for improved visibility and to protect the base plastic material from outdoor environmental conditions. The base plastic material may be either a homopolymer or a copolymer. The coating is preferably of a suitable weather-proof, abrasion-resistant material impervious to ultra-violet radiation.

While certain specific embodiments of a protective cover assembly for guy wires or cables have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A protective cover assembly for a guy wire or the like comprising an elongated sleeve member formed with a longitudinal slit to allow the sleeve member to be engaged around a wire, and a clamp member secured in the sleeve member, said clamp member comprising a first jaw element secured to the sleeve member, a second jaw element opposite said first jaw element, a flexible band element movably connecting said jaw elements, said jaw elements defining a space therebetween substantially aligned with said slit and adapted to receive the wire when it has been passed through said slit, and means positioned between said space and said flexible band element for connecting said jaw elements and arranged to move one jaw element towards the other to clamp the wire therebetween.

2. The protective cover assembly of claim 1, and wherein said jaw elements are formed with a plurality of pairs of opposing arcuate clamping recesses of different sizes and are dimensioned to clampingly engage different sizes of wire therebetween.

3. The protective cover assembly of claim 1, and a channel-shaped clip member slidably engaged over the corner portions of the segments defined by said slit at the other end of the sleeve member, and means securing said clip member to one of said corner portions.

4. The protective cover assembly of claim 1, and wherein said jaw elements and flexible band element form an integral body, with the band element connecting the jaw elements and defining space between the band element and the adjacent portions of the jaw elements.

5. The protective cover assembly of claim 4, and wherein said connecting means extends through said adjacent portions of the jaw elements.

6. The protective cover assembly of claim 5, and wherein said connecting means comprises a headed clamping screw rotatably engaged with and bearing on said secured jaw element and threadedly engaged with said second jaw element.

7. The protective cover assembly of claim 6, and wherein said secured jaw element has a counterbore containing the head of the clamping screw and the sleeve member has an aperture in registry with said counterbore.

8. The protective cover assembly of claim 6, and wherein said jaw elements are formed with a plurality of pairs of opposing wire-gripping recesses increasing in size outwardly toward the wire-entry slit of the sleeve member.

9. The protective cover assembly of claim 8, and a channel-shaped clip member secured to the corner portion of one of the segments defined by the slit at the other end of the sleeve member and slidably receiving the corner portion of the other slit-defined segment of the sleeve member, acting to hold said corner portions substantially in circumferential alignment.

10. The protective cover assembly of claim 9, and wherein said sleeve member is provided with an enlarged bottom end portion for accommodating anchor connections of the wire and wherein said clamp member is secured in said enlarged bottom end portion.

11. The protective cover assembly of claim 4, wherein a portion of said space between the band element and the adjacent portions of the jaw elements is of a generally elliptical shape.

12. The protective cover assembly of claim 1, wherein said first and second jaw elements and said flexible band element together comprise a one-piece unitary construction.

13. The protective cover assembly of claim 1, wherein said means connecting said jaw elements is disposed within said jaw elements.

14. The protective cover assembly of claim 13, wherein said sleeve member includes aperture means formed therein for rendering said connecting means easily accessible from the outside of said sleeve member.

15. The protective cover assembly of claim 1, wherein said flexible band element comprises a pair of spaced apart ends defining first and second pivots to which said first and second jaw elements are respectively pivotally connected.

16. The protective cover assembly of claim 15, wherein the distance between said first and second pivots is greater than the distance between the adjacent portions of said first and second jaw elements which define said space.

17. A clamp device for use in a protective cover member, said clamp device comprising a first rigid jaw element, a second rigid jaw element opposite said first jaw element, a flexible band element having first and second spaced pivot ends to which said first and second jaw elements are respectively pivotally connected, said jaw elements defining a gripping space therebetween shaped to receive a wire or the like, and means disposed between said band element and said gripping space for connecting said jaw elements and arranged to move said jaw elements together to clamp the wire therebetween.

18. The clamp device of claim 17, and wherein said jaw elements are formed with a plurality of pairs of opposing arcuate clamping recesses of different sizes which are dimensioned to clampingly engage with different sizes of wire received therebetween.

19. The clamp device of claim 17, and wherein said first and second jaw elements and said band element together comprise a one-piece unitary construction.

20. The clamp device of claim 17, wherein the distance between said first and second spaced pivot ends is greater than the distance between the adjacent portions of said first and second jaw elements which define said gripping space.

21. The clamp device of claim 17, wherein said means for connecting said jaw elements is disposed within said jaw elements.

22. The clamp device of claim 17, wherein the space defined by said band element and adjacent portions of said jaw elements is of a generally elliptical shape.

* * * * *